(12) United States Patent
Richards et al.

(10) Patent No.: US 10,545,351 B2
(45) Date of Patent: Jan. 28, 2020

(54) OPTICAL SYSTEM FOR IMAGE PROJECTORS

(71) Applicant: Dolby Laboratories Licensing Corporation, San Francisco, CA (US)

(72) Inventors: Martin J. Richards, Gig Harbor, WA (US); Duane Scott Dewald, Dallas, TX (US); Nathan Wainwright, Melissa, TX (US); Barret Lippey, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/363,651

(22) Filed: Mar. 25, 2019

(65) Prior Publication Data
US 2019/0219830 A1 Jul. 18, 2019

Related U.S. Application Data

(63) Continuation of application No. 15/767,090, filed as application No. PCT/US2016/056469 on Oct. 11, 2016, now Pat. No. 10,281,730.
(Continued)

(30) Foreign Application Priority Data

Dec. 14, 2015 (EP) .................................. 15199853

(51) Int. Cl.
*H04N 9/31* (2006.01)
*G03B 21/14* (2006.01)
(Continued)

(52) U.S. Cl.
CPC .......... *G02B 27/0961* (2013.01); *G02B 5/02* (2013.01); *G02B 27/0994* (2013.01);
(Continued)

(58) Field of Classification Search
CPC ............ G02B 27/0961; G02B 27/0994; G02B 27/30; G02B 26/01; G03B 21/005;
(Continued)

(56) References Cited

U.S. PATENT DOCUMENTS

| | | | |
|---|---|---|---|
| 4,516,832 A | 5/1985 | Jain | |
| 4,619,508 A | 10/1986 | Shibuya | |

(Continued)

FOREIGN PATENT DOCUMENTS

| | | |
|---|---|---|
| WO | 2010/015478 | 2/2010 |
| WO | 2010/090190 | 8/2010 |

OTHER PUBLICATIONS

Crowther, B.G. "A Fly's Eyecondenser system for uniform illumination", Proc. SPIE 4832, International Optical Design Conference 2002, Dec. 1, 2002, pp. 302-310.
(Continued)

*Primary Examiner* — William C. Dowling

(57) ABSTRACT

A projector system comprising a laser light source, a collimating lens, a fly-eye lens, an integrating rod and a first modulator is disclosed. The light from a laser light source/fiber illuminates a collimator to substantially collimate the light and then is transmitted through a fly's-eye lens. The fly's-eye lens provides a desired angular/spatial light distribution for further processing to a first modulator of the projector system.

15 Claims, 14 Drawing Sheets

Related U.S. Application Data

(60) Provisional application No. 62/239,927, filed on Oct. 11, 2015, provisional application No. 62/241,067, filed on Oct. 13, 2015.

(51) Int. Cl.
| | | |
|---|---|---|
| *G02B 27/09* | (2006.01) | |
| *G02B 5/02* | (2006.01) | |
| *G02B 27/30* | (2006.01) | |
| *G03B 21/00* | (2006.01) | |
| *G03B 21/20* | (2006.01) | |
| *G02B 26/10* | (2006.01) | |

(52) U.S. Cl.
CPC ........... *G02B 27/30* (2013.01); *G03B 21/005* (2013.01); *G03B 21/206* (2013.01); *G03B 21/208* (2013.01); *G03B 21/2033* (2013.01); *G03B 21/2066* (2013.01); *H04N 9/31* (2013.01); *H04N 9/3126* (2013.01); *H04N 9/3152* (2013.01); *H04N 9/3161* (2013.01); *G02B 26/101* (2013.01)

(58) Field of Classification Search
CPC .... G03B 21/2066; H04N 9/31; H04N 9/3126; H04N 9/3152; H04N 9/3161
See application file for complete search history.

(56) References Cited

U.S. PATENT DOCUMENTS

| | | | |
|---|---|---|---|
| 5,253,110 | A | 10/1993 | Ichihara |
| 5,715,021 | A | 2/1998 | Gibeau |
| 6,227,682 | B1 | 5/2001 | Li |
| 6,285,855 | B1 | 9/2001 | Tsuji |
| 6,515,257 | B1 | 2/2003 | Jain |
| 7,245,802 | B2 | 7/2007 | Tanaka |
| RE39,846 | E | 9/2007 | Tanitsu |
| 7,431,460 | B2 * | 10/2008 | Hall, Jr. ............... H04N 5/7441 348/E5.073 |
| 7,731,367 | B2 * | 6/2010 | Whitehead ............. G03B 21/60 353/30 |
| 8,125,702 | B2 | 2/2012 | Ward |
| 8,531,492 | B2 | 9/2013 | Wallener |
| 8,684,533 | B2 | 4/2014 | Whitehead |
| 8,860,640 | B2 | 10/2014 | Perkins |
| 8,890,905 | B2 | 11/2014 | Kwong |
| 8,894,214 | B2 * | 11/2014 | Tomioka ............... G03B 21/008 348/771 |
| 9,022,582 | B2 | 5/2015 | Kang |
| 9,134,537 | B2 | 9/2015 | Kajiyama |
| 9,135,864 | B2 | 9/2015 | Shields |
| 9,864,243 | B2 | 1/2018 | Erinjippurath |
| 2005/0047723 | A1 | 3/2005 | Li |
| 2007/0127245 | A1 | 6/2007 | Magarill |
| 2010/0165307 | A1 | 7/2010 | Mizushima |
| 2010/0171927 | A1 * | 7/2010 | Kitano ................... G02B 26/06 353/20 |
| 2010/0231862 | A1 | 9/2010 | Itoh |
| 2013/0063706 | A1 | 3/2013 | Kilcher |
| 2014/0028985 | A1 * | 1/2014 | Janssens ............... G02B 27/48 353/31 |
| 2015/0036057 | A1 | 2/2015 | Richards |
| 2018/0007327 | A1 | 1/2018 | Richards |
| 2018/0024429 | A1 | 1/2018 | Dewald |

OTHER PUBLICATIONS

Riser, A.P. et al "Analysis of single lens arrays using convolution", Opt. Eng. 40(5), 805-813 (May 1, 2001).

Voelkel, R. et al "Laser Beam Homogenizing: Limitations and Constraints", Proc. SPIE 7102, Optical Fabrication, Testing, and Metrology III, 71020J, Sep. 2-5, 2008.

Zhang, W. et al "Fly-eyes Illumination Analysis", Proc. SPIE 7506, 2009 International Conference on Optical Instruments and Technology: Optical Systems and Modern Optoelectronic Instruments, Dec. 1, 2009 vol. 7506.

* cited by examiner

OPTICAL SYSTEM FOR IMAGE PROJECTORS

CROSS-REFERENCE TO RELATED APPLICATIONS

This application is a continuation and claims the benefit of priority to U.S. patent application Ser. No. 15/767,090 filed on Apr. 9, 2018, which is a 371 of International Patent Application No. PCT/US2016/056469 filed Oct. 11, 2016, which claims priority to U.S. Provisional Patent Application Ser. No. 62/239,927 filed on Oct. 11, 2015 and U.S. Patent Provisional Application Ser. No. 62/241,067 filed on Oct. 13, 2015, and European Patent Application No. 15199853.1 filed on Dec. 14, 2015, all of which are hereby incorporated by reference in their entirety.

TECHNICAL FIELD

The present invention relates to projector systems and, particularly, to improved light conduits for laser-based image projection systems.

BACKGROUND

Projector systems are now being architected with improvements in dynamic range. Many of these types of improvements are in the area of laser projection systems. Some such laser projections systems may also comprise dual and multi-modulator projector display systems. It may be desirable to improve the performance of these improved image projection systems.

SUMMARY

A projector system comprising a laser light source, a collimating lens, an optical homogenizing element (e.g., a fly-eye lens or comprising a fly-eye lens), an integrating rod and a first modulator is disclosed. The laser light source may comprise one or more single laser fiber sources. The light from the laser light source/fiber illuminates a collimator to substantially collimate the light and then is transmitted through the optical homogenizing element (e.g., the fly's-eye lens). The optical homogenizing element (e.g., the fly's-eye lens) provides a desired angular/spatial light distribution for further processing to a first modulator of the projector system. The integrating rod is arranged directly adjacent to the homogenizing element along a light path through the projector system. In other words, the light from the homogenizing element passes directly to the integrating rod, without passage through other optical elements.

In one embodiment, a projection system, comprising: a laser light source, the source providing light for further processing by the system; a collimating lens, the collimating lens substantially collimating the light from the laser light source; a fly-eye lens, receiving substantially collimated light and providing a desired angular distribution of light; an integrating rod, receiving the light from the fly-eye lens and transmitting the light downstream; and a first modulator, receiving the light from the integrating rod and performing additional modulation to the light for the system to project an image. The fly's-eye lens may comprises a plurality of optical elements (e.g., lenslets). Further, the fly's-eye lens may be set an optical distance from the integrating rod such that the optical elements of the fly's-eye lens produce an overlapping pattern on the input of the integrating rod.

In another embodiment, a method for providing a desired distribution of light in a projector system comprising a laser light fiber for input illumination, comprising: transmitting the light from the laser light fiber to a collimator; transmitting the light from the collimator to an optical homogenizing element (e.g., a fly's-eye lens); and transmitting the light from the optical homogenizing element (e.g., the fly's-eye lens) to an integrating rod. Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
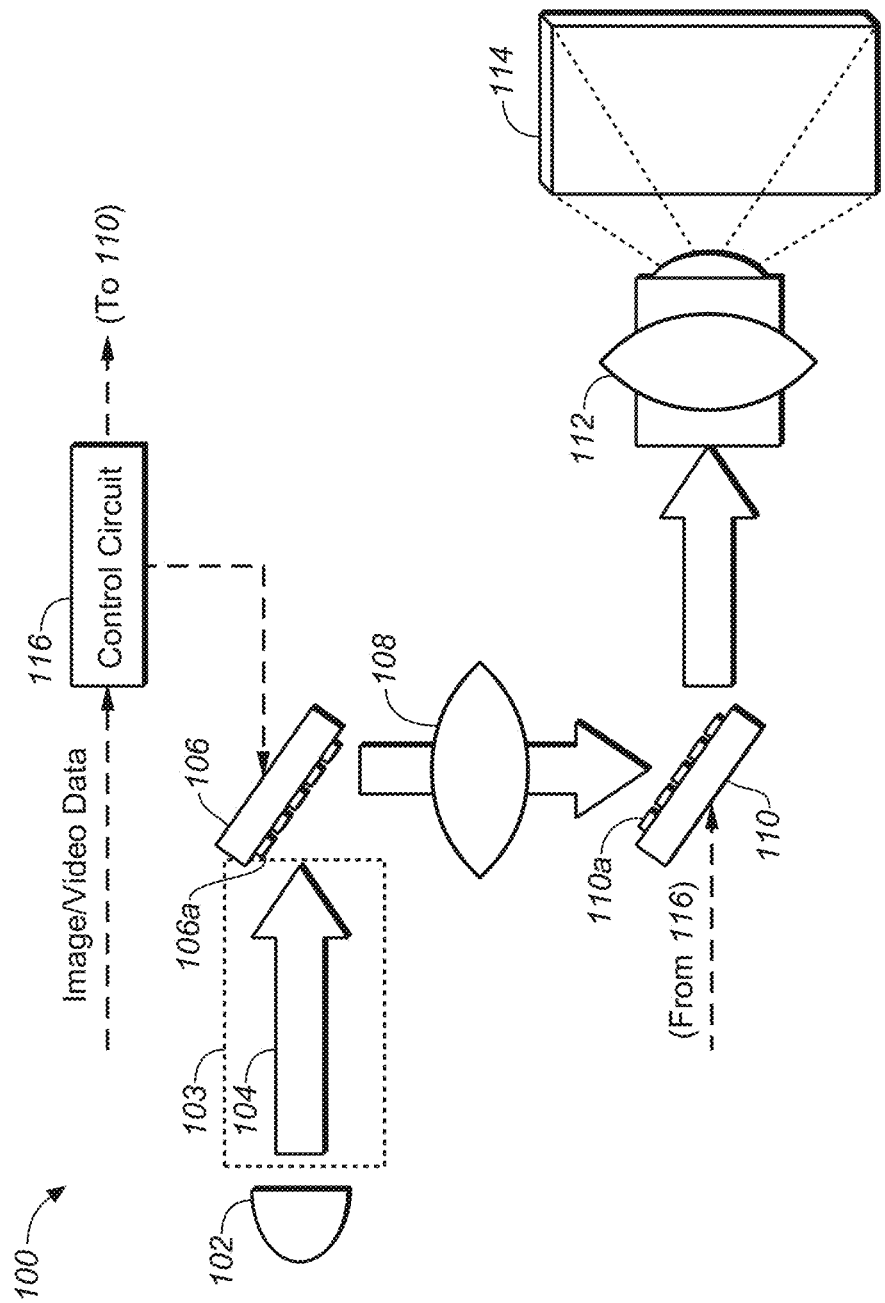
FIG. 1 depicts one schematic embodiment of an image projector display system as may be suitable for the improved integrating rod of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

In the field of projector and other display systems, it is desirable to improve both image rendering performance and system efficiency. Several embodiments of the present application describe systems, method and techniques to affect these improvements by employing light field modeling for dual, or multi-modulation display systems. In one embodiment, light source models are developed and used to advantageous effect. Camera pictures of displayed images of known input images may be evaluated to improve light models. In some embodiments, an iterative process may accumulate improvements. In some embodiments, these techniques may be used on moving images to make live adjustments to improve image rendering performance.

Dual modulation projector and display systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";
(2) United States Patent Application 20130148037 to Whitehead et al., published on Jun. 13, 2013 and entitled "PROJECTION DISPLAYS";
(3) United States Patent Application 20110227900 to Wallener, published on Sep. 22, 2011 and entitled "CUSTOM PSFs USING CLUSTERED LIGHT SOURCES";
(4) United States Patent Application 20130106923 to Shields et al., published on May 2, 2013 and entitled "SYSTEMS AND METHODS FOR ACCURATELY REPRESENTING HIGH CONTRAST IMAGERY ON HIGH DYNAMIC RANGE DISPLAY SYSTEMS";
(5) United States Patent Application 20120038693 to Kang et al., published on Feb. 16, 2012 and entitled "HIGH DYNAMIC RANGE PROJECTION SYSTEM";
(6) United States Patent Application 20110279749 to Erinjippurath et al., published on Nov. 17, 2011 and entitled "HIGH DYNAMIC RANGE DISPLAYS USING FILTERLESS LCD(S) FOR INCREASING CONTRAST AND RESOLUTION" and
(7) United States Patent Application 20120133689 to Kwong, published on May 31, 2012 and entitled "REFLECTORS WITH SPATIALLY VARYING REFLECTANCE/ABSORPTION GRADIENTS FOR COLOR AND LUMINANCE COMPENSATION".

all of which are hereby incorporated by reference in their entirety.

One Exemplary Physical Architecture

FIG. 1 shows one possible embodiment of a suitable image projector display system. In this embodiment, the projector display system is constructed as a dual/multi-modulator projector display system 100 that may suffice for the purposes of the present application. Projector system 100 employs a light source 102 that supplies the projector system with a desired illumination such that a final projected image will be sufficiently bright for the intended viewers of the projected image. Light source 102 may comprise any suitable light source possible—including, but not limited to: Xenon lamp, laser(s), coherent light source, partially coherent light sources. As the light source is a major draw of power and/or energy for the entire projector system, it may be desirable to advantageously use and/or re-use the light, so as to conserve the power and/or energy during the course of its operation.

Light 104 may illuminate a first modulator 106 that may, in turn, illuminate a second modulator 110, via a set of optional optical components 108. Light from second modulator 110 may be projected by a projection lens 112 (or other suitable optical components) to form a final projected image upon a screen 114. First and second modulators may be controlled by a controller 116—which may receive input image and/or video data. Controller 116 may perform certain image processing algorithms, gamut mapping algorithms or other such suitable processing upon the input image/video data and output control/data signals to first and second modulators in order to achieve a desired final projected image 114. In addition, in some projector systems, it may be possible, depending on the light source, to modulate light source 102 (control line not shown) in order to achieve additional control of the image quality of the final projected image.

Light recycling module 103 is depicted in FIG. 1 as a dotted box that may be placed in the light path from the light source 102 to the first modulator 106, as will be discussed below. While the present discussion will be given in the context of this positioning, it will be appreciated that light recycling may be inserted into the projector system at various points in the projector system. For example, light recycling may be placed between the first and second modulators. In addition, light recycling may be placed at more than one point in the optical path of the display system. While such embodiments may be more expensive due to an increase in the number of components that increase may be balanced off against the energy cost savings as a result of multiple points of light recycling.

While the embodiment of FIG. 1 is presented in the context of a dual, multi-modulation projection system, it should be appreciated that the techniques and methods of the present application will find application in single modulation, or other dual, multi-modulation display systems. For example, a dual modulation display system comprising a backlight, a first modulator (e.g., LCD or the like), and a second modulator (e.g., LCD or the like) may employ suitable blurring optical components and image processing methods and techniques to affect the performance and efficiencies discussed herein in the context of the projection systems.

It should also be appreciated that—even though FIG. 1 depicts a two-stage or dual modulator display system—the methods and techniques of the present application may also find application in a display system with only one modulator or a display system with three or more modulator (multi-modulator) display systems. The scope of the present application encompasses these various alternative embodiments.

Figure 2:
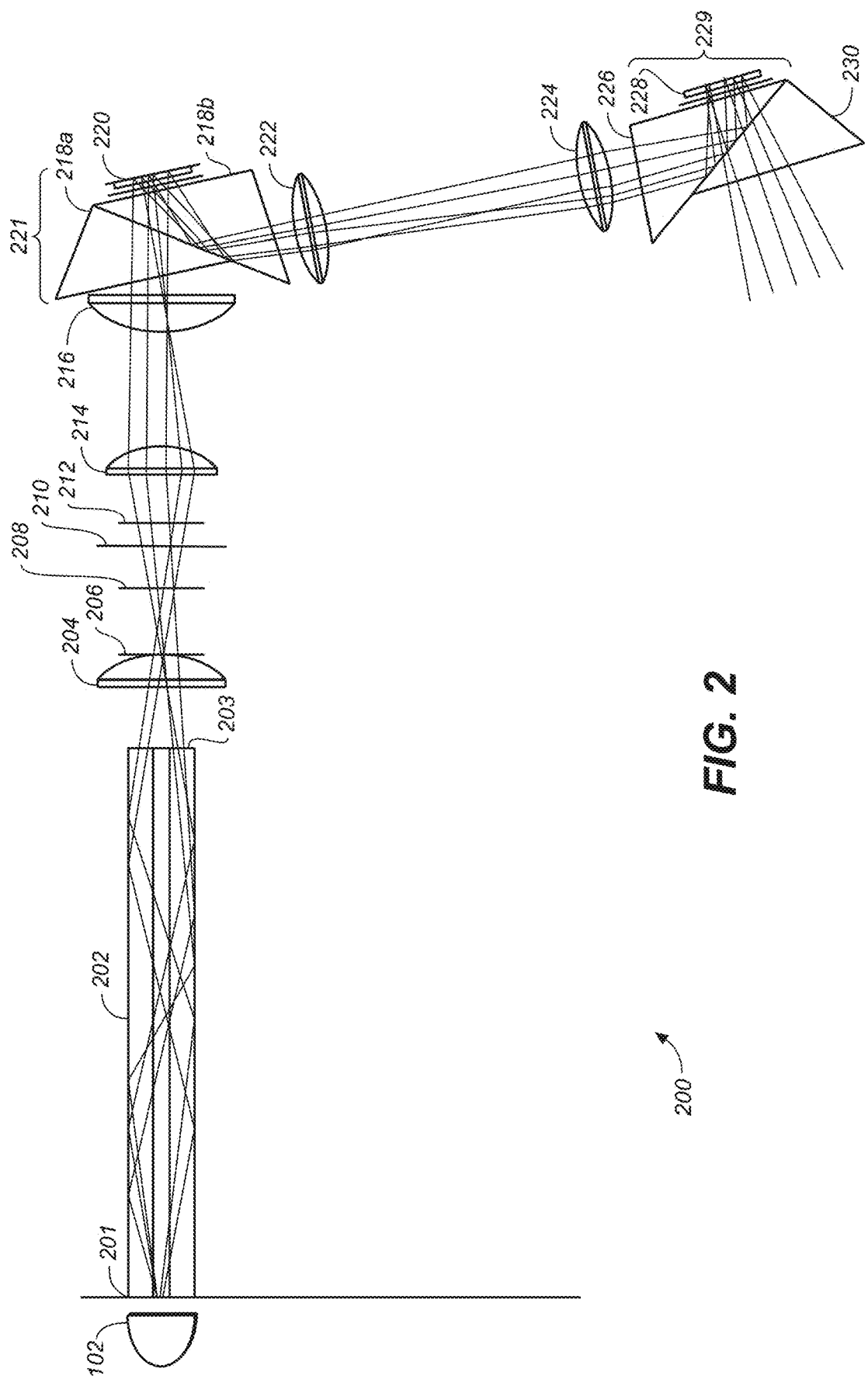
FIG. 2 depicts one embodiment of a light conduit module that suffices for the purposes of the present application.

FIG. 2 depicts one embodiment of a light conduit subsystem and/or module 200, as may be used in an embodiment, such as FIG. 1. As discussed above, this light conduit subsystem/module may be placed in the projector system primarily between the light source 102 and a first modulator 221. Light from light source 102 may be input to the optical path via an integrating rod/tube/box 202. In one embodiment, integrating rod/tube/box 202 may comprise a substantially reflective surface in its interior, so that light that is incident on its surface may be reflected (e.g., possibly multiple times) until the light exits its extreme right end 203. Once the light exits the integrating rod/tube/box, the light may be placed into an optical path that is defined by a set of optical elements—e.g., lens 204, 214 and 216 and a set of filters and/or polarizers 206, 208, 210 and 212. This embodiment may also be constructed to perform light recycling, if desired for the design of this projector system.

First modulator 221 may comprise a number of prisms 218a, 218b and a reflector 220. Reflector 220 may comprise a DMD array of reflectors, or a MEMS array—or any other suitable set of reflectors possible that may reflect light in at least two or more paths. One such path is depicted in FIG. 2. As may be seen, reflectors 220 direct the light onto the interface of prisms 218a and 218b, such that the light is thereby reflected into lens assembly 222 and thereafter to second modulator 229 (e.g., comprising lens assembly 224, prisms 226 and 230 and reflector 228). This light may be employed to form the finally projected image to be viewed by an audience.

However, at certain time during the rendering of the final projected image, the full power/energy of the light source 102 may not be needed. If it is not possible to module the power of light source 102 (or if it is difficult or if there is additional opportunity to conserve light), then it may be desired to recycle the light from light source 102. In this case, and as may be seen in FIG. 2, it may be possible to align reflector 220 from its current position as shown (i.e., where the light is directed to travel the path down to the second modulator—to position instead where the light would be substantially reflected back to the integrating rod/tube/box 202, along substantially the same path as described as traveling from right-to-left direction.

In another embodiment, a third (optional) path (not shown) allows the reflectors to direct light from the light source to a light "dump"—i.e., a portion of the projector system where the light is absorbed. In this case, the light is wasted as heat to be dissipated from the projector system. Thus, the projector system may have multiple degrees of freedom when it comes to directing the light as desired.

Figure 3:
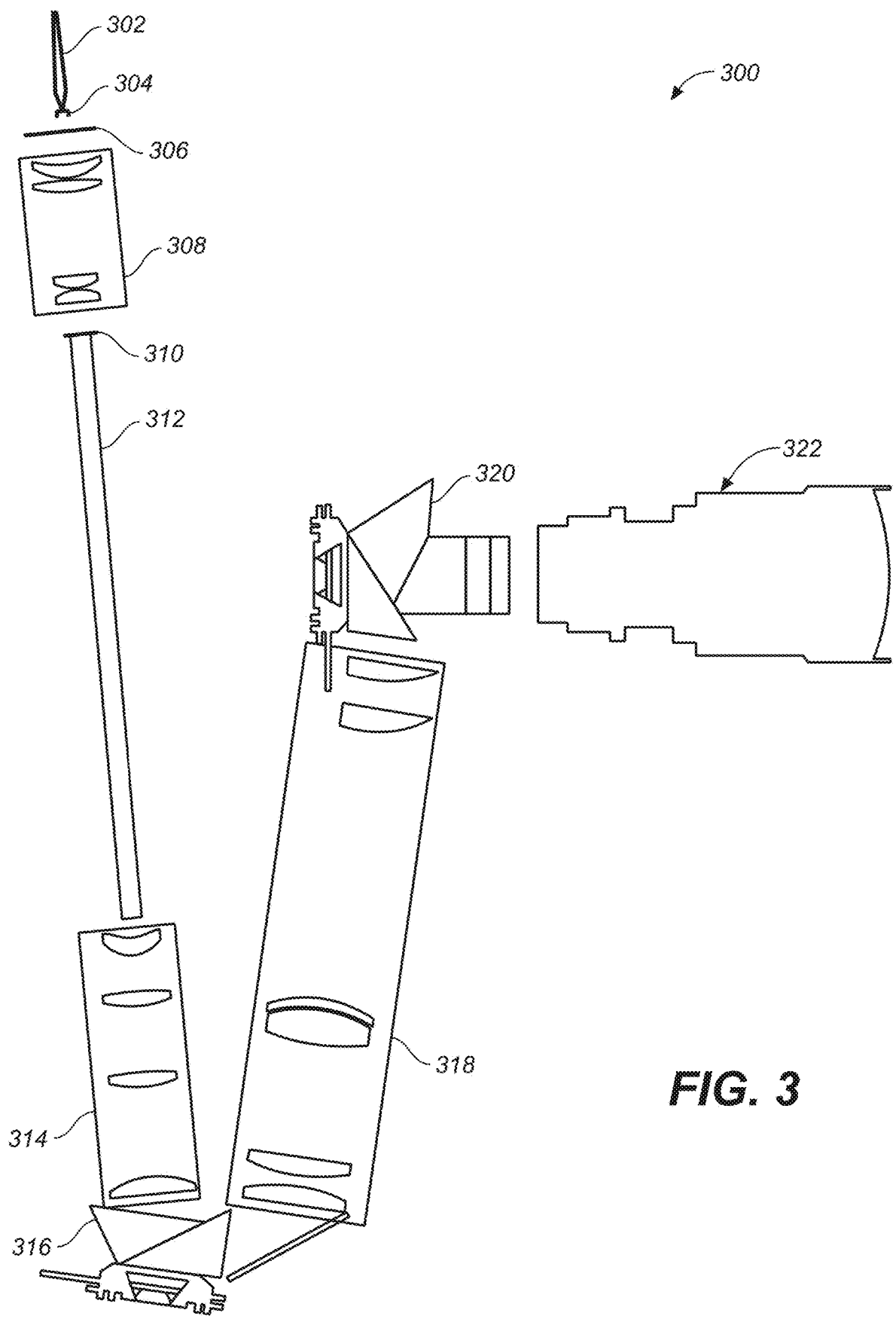
FIG. 3 depicts another embodiment of a light conduit module that may suffice for the purposes of the present application.

FIG. 3 is yet another embodiment of a light conduit module 300—which may serve to transmit light from at least one laser and/or partially coherent colored light source and ports (e.g., through fiber launch 302, collimator 304, diffuser 306). Light from such a source may transmit through a first optical subsystem/diffuser relay 308 to condition the light to be input into integrating rod 312—which may comprise the reflecting proximal end 310 (e.g., recycling mirror), such as in FIG. 3. A second optical subsystem/recycling relay 314 may further condition the light as desired prior to input into a first modulator 316. As with FIG. 2 above, this first leg of the module 300 may affect a light recycling mode, as discussed.

After first modulation, light may be transmitted through a third optical subsystem/PSF relay 318 prior to input into a second modulator 320—which modulates the light for transmission through a projector optical subsystem 322 to project a final image for viewing. With continued reference to FIG. 3, there is shown a relay optical system 318 that is placed in between a first modulator 316 (e.g., a pre-modulator) and a second modulator 320 (e.g., a primary modulator/nine piece prism). Such a relay optical system may be desirable to both reduce the amount of artifacts in the image processing—as well as increasing the contrast of the projected image.

As discussed herein in the context of one embodiment, it may be desirable for the first modulator/pre-modulator to produce a blurred and/or de-focused image based upon image data values, such as the halftone image mentioned herein. In many embodiments, it may be desirable to have a relay optical system that tends to produce a uniformly blurred/de-focused image from the pre-modulator to the primary modulator. In addition, it may be desirable to have a desired, defocused spot shape for this embodiment.

In many embodiments, the relay optical system may comprise lenses or other optical elements that effectively moves the focal plane, corrects for any coma, and adjusts the spread (e.g., by creating defocus/blur and adding spherical aberration to some desired amount).

Improved Laser Source Launch Embodiment

In some embodiments, when launching a single-fiber laser light source into a system with an integrating rod, it is desired to reduce the energy density of the laser spot on the entry face as well as increase the diversity of angles. The plurality of angles allows for better mixing and greater uniformity at the output end of the integrator.

In addition, in many embodiments, it may be desirable to have a substantially structureless and/or uniform illumination at an imaginary plane at a desired point in the light path through the image projector. For example, one embodiment would be to have this desired illumination in a plane between the first modulator and the second modulator in a dual modulator projection system. In such a case, such an illumination may provide a good Gaussian Point Spread Function (PSF) at this plane.

In many embodiments, the projection system may employ a small number of single fiber laser light sources. It may suffice that there be a good spatial and/or angular distribution of illumination for the discrete number of laser light sources.

Use of a multiplicity of fibers and fly's eye lens is, in one embodiment, for example, arranged to produce a repeating but overlapping pattern of the multiple fibers on the input of the integrating rod. As may be accomplished in this and other embodiments described herein, the overlapping pattern on the input of the integrating rod is a defocused overlapping pattern. Additionally, the system forms a pinhole camera with infinite (or substantially infinite) focal range, so the upstream images should be as broad and uniform as possible. This is why it may be desirable to have a spatially diverse image at the input to the integrating rod.

In many projection systems, the spatial uniformity at the spatial light modulator is an important criteria, and projector illumination optics designs reflect that fact; however, very little effort is typically made to have good angular diversity. In certain dual modulation architectures, the pre-modulator (pre-mod) is imaged to the primary modulator, and it is desirable that this image be blurred (e.g., as a low resolution version of the projected image). This can be achieved by, e.g., a defocus. When using the pre-mod to primary modulator relay lens to achieve this defocus, it is desired that the point spread function of the optics have a smooth structure. In order to achieve this, the illumination at the pre-mod should have good angular as well as good spatial uniformity. Many embodiments of the present application provide for an illumination system with a diverse (and smooth) angular distribution as well as a uniform spatial distribution.

In addition to improve the angular distribution of laser light (and particularly, of a single laser source), it may be desired that no (or very minimal) structure of the light source translates into noticeable artifacts at the projected image.

Figure 4:
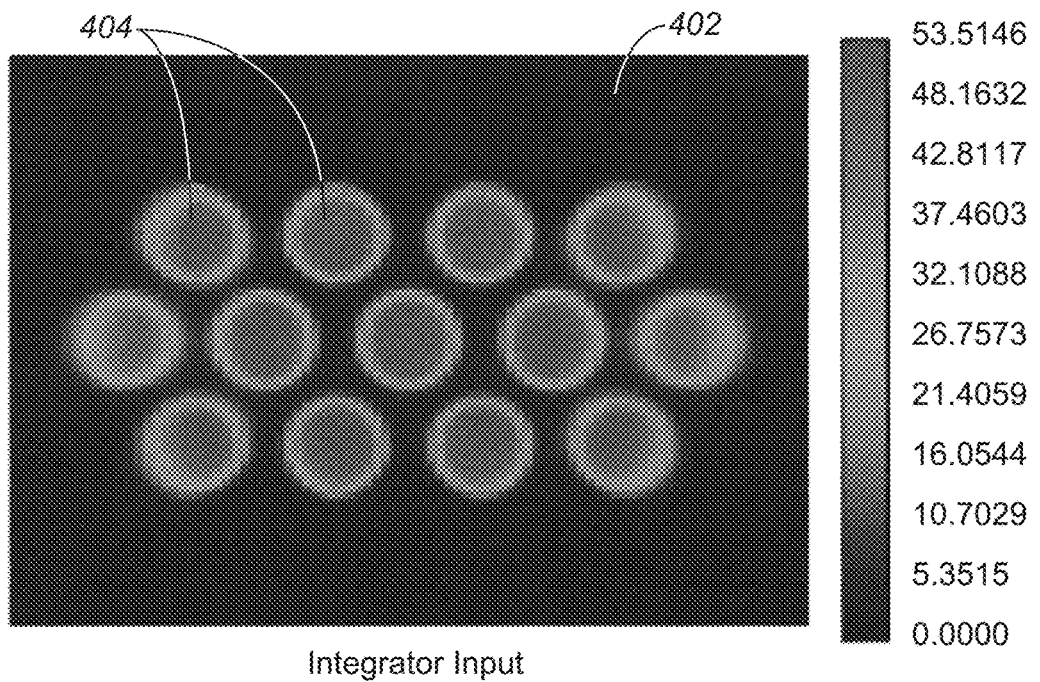
FIG. 4 depicts a cross-section of illumination provided by an array of laser light fibers as may be applied to the input of an integrator.
Figure 5:
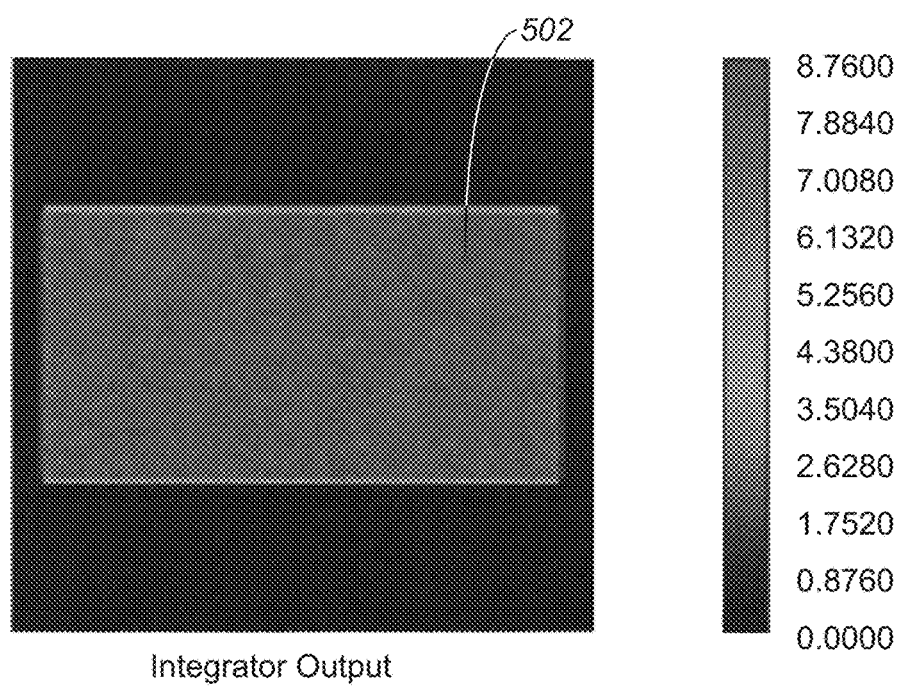
FIG. 5 depicts a cross-section of illumination provided by the light from an array of laser light fibers at the output of an integrator.
Figure 6:
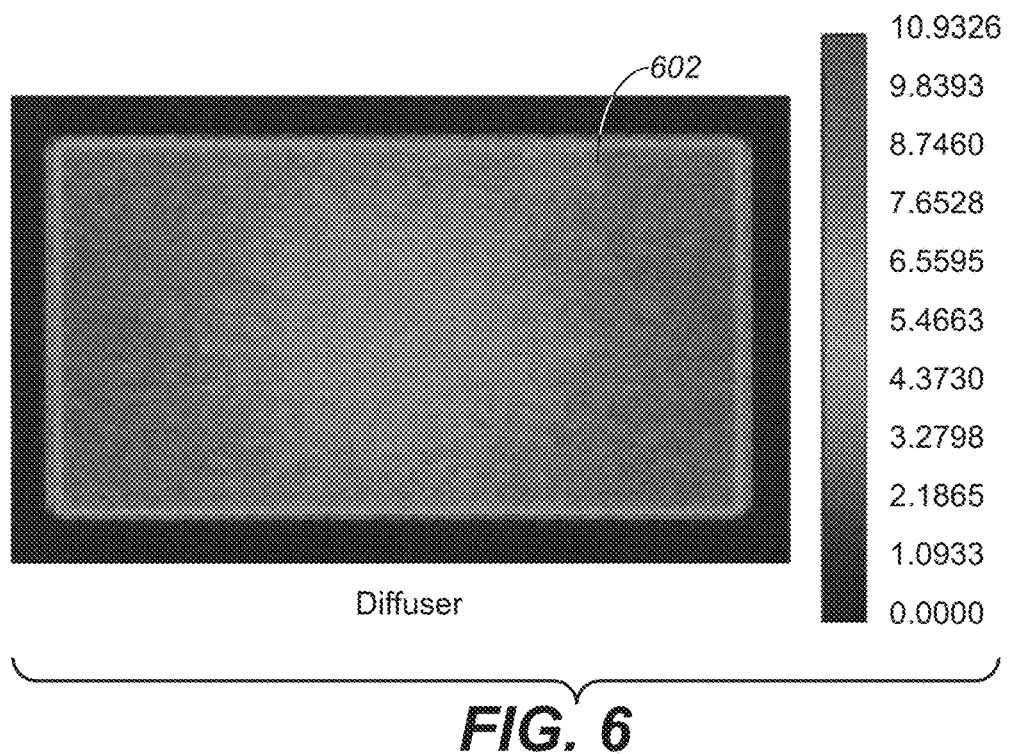
FIG. 6 depicts a cross-section of illumination provided by the light of an array of laser light fibers after a diffuser.
Figure 7:
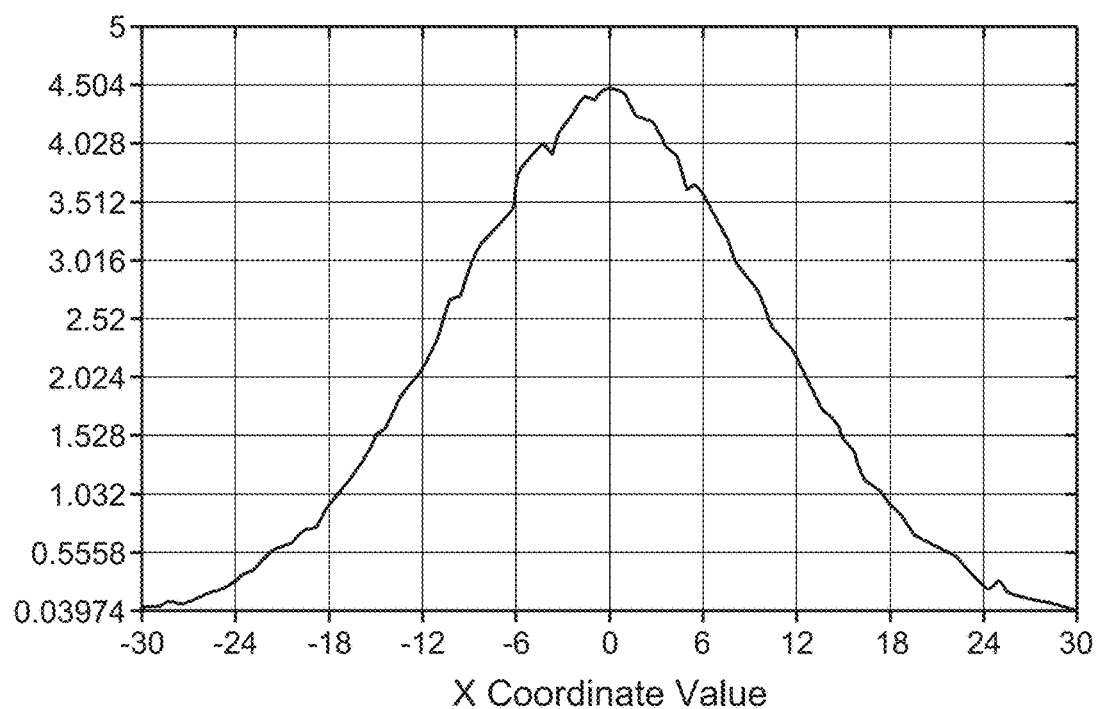
FIG. 7 depicts the angular distribution of the light at the light from the output of an integrator, as depicted in FIG. 5.

In the situation involving multiple fiber light inputs, FIG. 4 depicts the case in which multiple laser inputs 404 are input into an integrator (e.g., an integrating rod or the like). As may be seen, the discrete fiber light inputs 404 are highly visible across the cross-sectional area 402. This visible structure is not desirable to employ when illuminating any downstream modulators. FIG. 5 depicts a somewhat ideal cross-sectional area of illumination 502 that might be present after the use of a diffuser. FIG. 6 depicts the cross-sectional area 602 of illumination that may be present after the diffuser. Such a diffuser may be used as a front end optical element prior to an integrating rod—or possibly, between two or more integrating rods employed in the projector system. FIG. 7 shows a putative angular disbursement of illumination that may occur after the diffusion of the light after the diffuser and the integrating rod(s).

Figure 8:
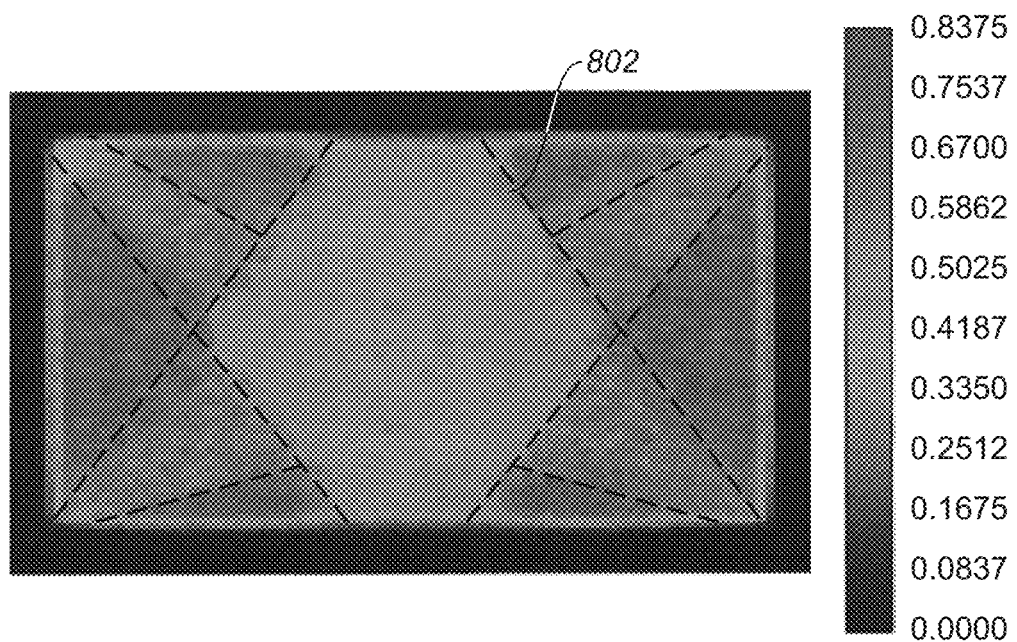
FIGS. 8 and 9 depict the light at the output of the integrator from the light of one laser light fiber and the light possibly provided to a first modulator in a projector system.
Figure 9:
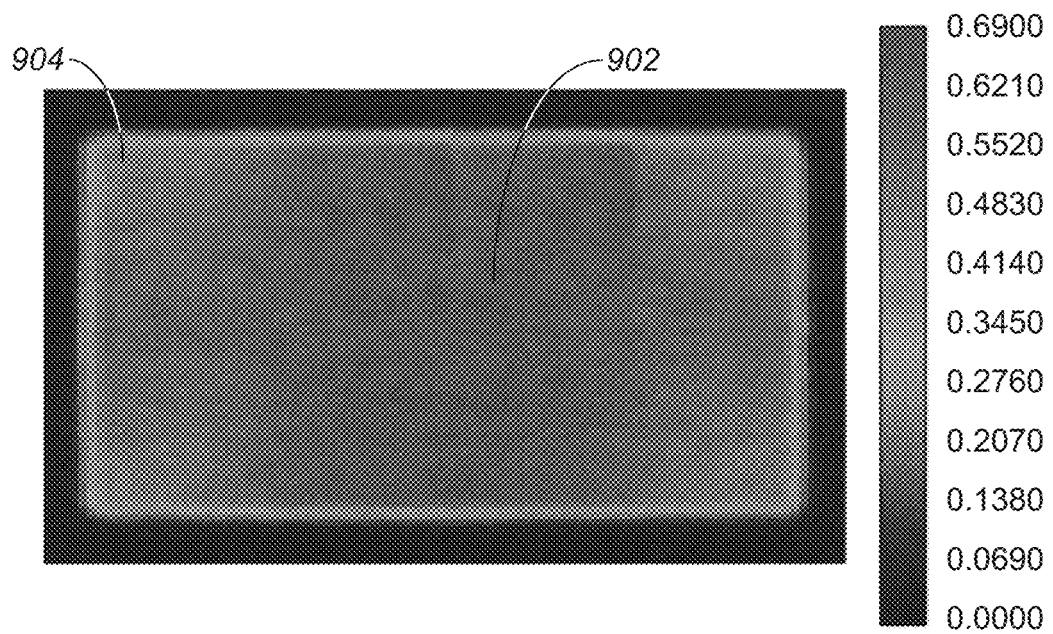

By comparison, the situation may be less desirable in the case where the illumination comes primarily from one (or a small number) of laser fiber(s). FIG. 8 depicts the cross-sectional illumination that may be seen after illumination from a single fiber is placed into an integrator and illuminating a diffuser (e.g., possibly prior to entering another integrator stage). As may be seen, there is visible structure 802 in this cross-sectional area—and this may not be desirable illumination for a modulator stage. FIG. 9 depicts the cross-sectional illumination area of this light after a possible diffuser stage—again, some structure may be visible with strong illumination in the center portion 902—and weaker illumination patterns in the corner of the cross-sectional area (e.g., as depicted in 904).

Figure 10:
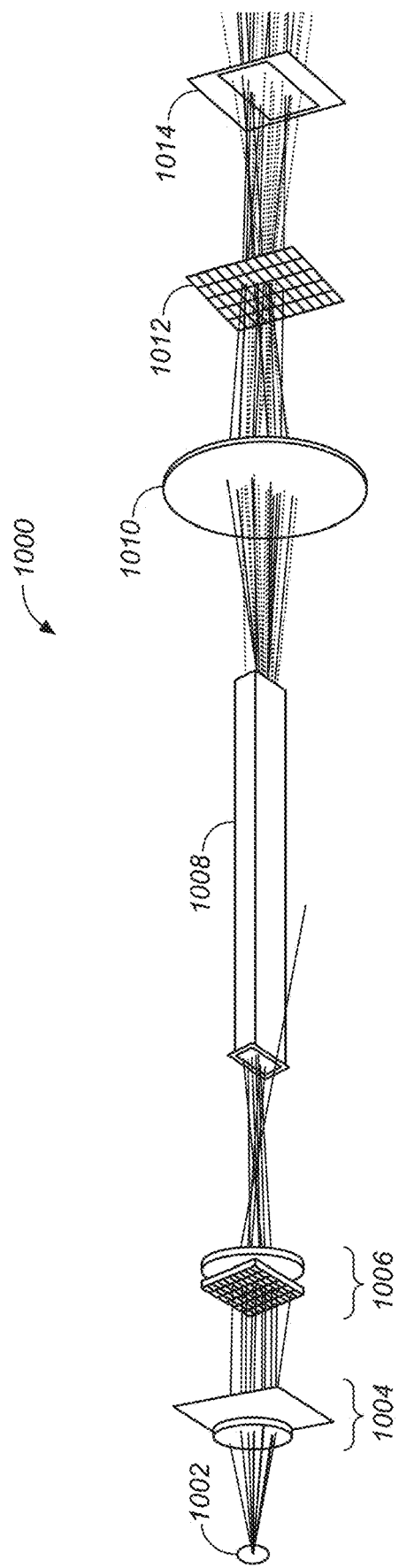
FIG. 10 depicts one embodiment of a front end optical system for a laser light fiber, as made in accordance with the principles of the present application.

FIG. 10 depicts one possible embodiment of a front-end fiber launch 1000 that may improve the cross-sectional illumination for further processing by one or more modulators. A single laser fiber source 1002 may be seen as illuminating a set of optical elements 1004 (collimator) that provides substantial collimation to the light source. The substantially collimated light may thereafter illuminate an optical homogenizing element (e.g., a fly's-eye lens arrangement) 1006. The fly's-eye lens arrangement may be arranged directly subsequent to the set of optical elements 1004 (collimator) that provides substantial collimation to the light source. As will be discussed further herein, the fly's-eye lens arrangement would tend to provide suitable angular distribution of illumination, in combination with optical power sufficient to substantially focus the light onto an integrating rod 1008. The fly's-eye lens arrangement may be arranged directly prior to the integrating rod 108, i.e., may be arranged directly adjacent to the integrating rod 108 along the light path through the front-end fiber launch 1000. Thereafter, light from the integrating rod 1008 may illuminate downstream optical element 1010 that may provide additional optical power that may be of desirable cross-sectional illumination (as depicted in imaginary plane 1012). This illumination may thereafter illumine a modulator (e.g., first modulator) 1014, as discussed herein.

Figure 11:
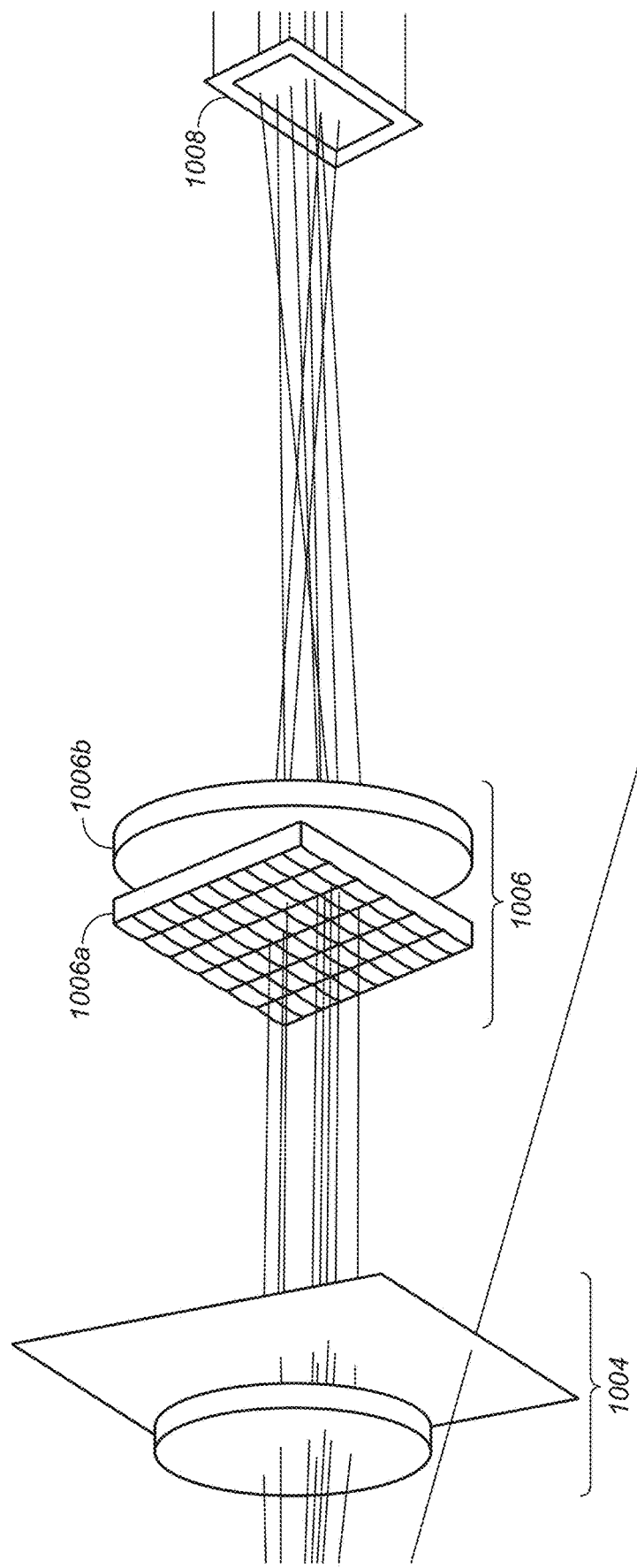
FIG. 11 depicts one embodiment of a fly's-eye lens arrangement, as made in accordance with the principles of the present application.

FIG. 11 provides a closer view of the fly's-eye lens arrangement 1006. Arrangement 1006 may comprise one or more optical components (e.g., as shown). Fly's-eye lens 1006a receives light from a collimator arrangement 1004 and an additional lens 1006b provides optical power for focusing the light onto the port of the integrating rod 1008. The combination of the fly-eye lens 1006a and focusing lens 1006b tends to create a rectangular shaped spot at integrator input 1008, with the aspect ratio of the spot being similar to the aspect ratio of the facets of 1006a, provided that all of the facets are the same size and shape. It should be appreciated that the light from the fly's-eye lens tends to be devoid of structure (e.g., from the laser light source) and tends to be of a more uniform illumination—than if the fly's-eye lens was not present in the light path. The fly-eye lens 1006a may be arranged directly subsequent to the collimator arrangement 1004 (along the light path), i.e., the collimator arrangement 1004 may be directly imaged to the fly-eye lens 1006a. The focusing lens 1006b may be arranged directly subsequent to the fly-eye lens 1006a (along the light path), i.e., the fly-eye lens 1006a may be directly imaged to the focusing lens 1006b. The integrator input 1008 may be arranged directly subsequent to the focusing lens 1006b (along the light path), i.e., the focusing lens 1006b may be directly imaged to the integrator input 1008. In other words, no further optical elements are arranged between the collimator arrangement 1004 and the fly-eye lens 1006a, no further optical elements are arranged between the fly-eye lens 1006a and the focusing lens 1006b, and no further optical elements are arranged between the focusing lens 1006b and the integrator input 1008.

Figure 12:
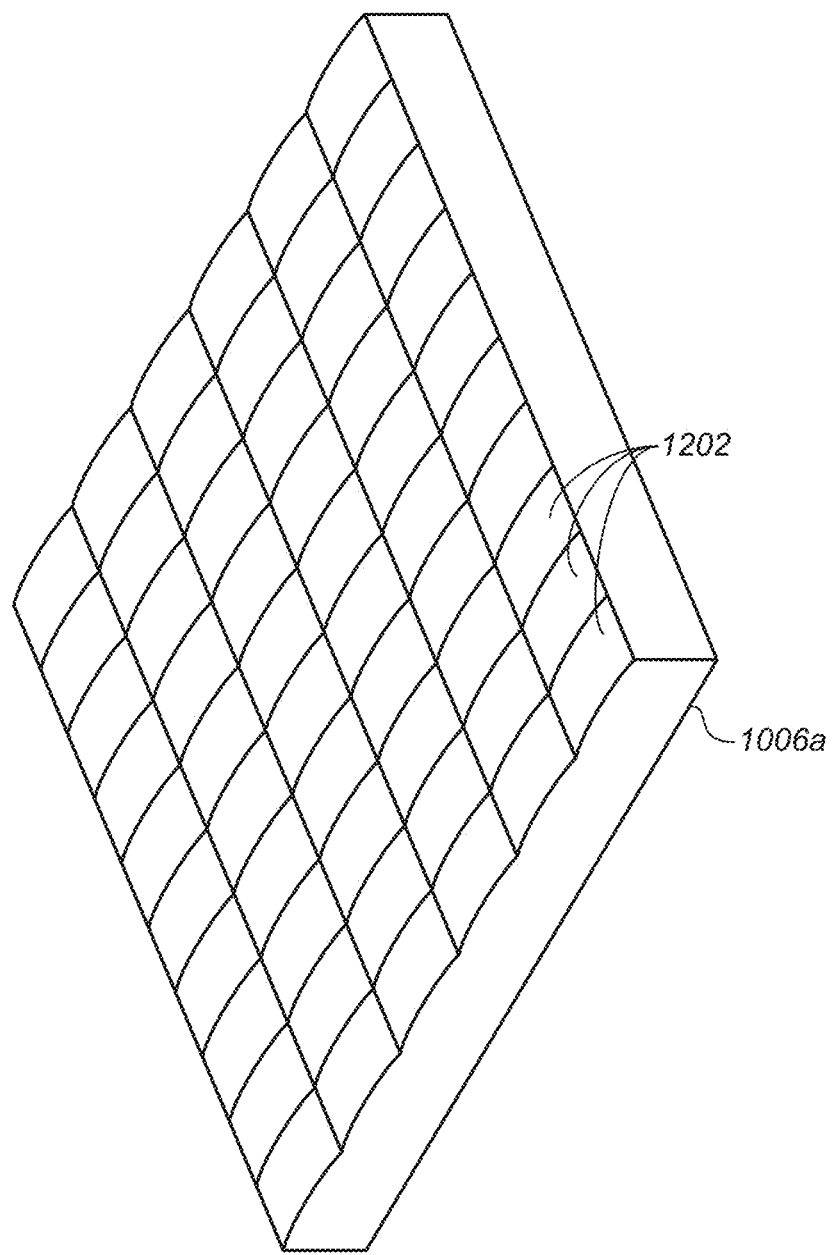
FIG. 12 depicts one embodiment of a fly's-eye lens, suitable for several embodiments described herein.
Figure 13:
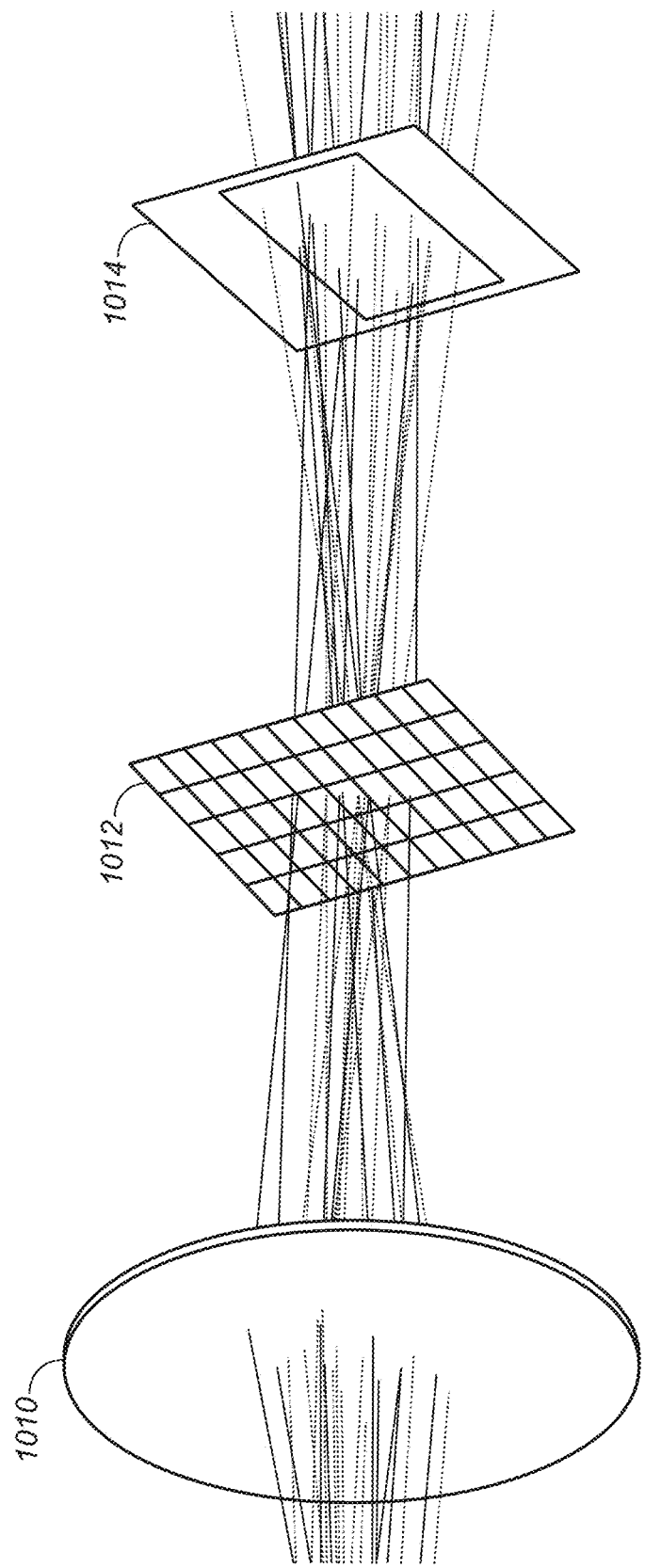
FIG. 13 depicts the possible cross-sectional illumination provided after light is transmitted through a fly's-eye lens embodiment of the present application.

FIG. 12 is one embodiment of a suitable fly's-eye lens 1006a for the purposes of the present application. As may be seen, an array of lenslets (e.g., rectangular lenslets) 1202 are provided to give suitable angular distribution of light—e.g., for input into the integrating rod. FIG. 13 depicts the imaginary cross-sectional area 1012 to depict the illumination after the light is transmitted through the fly's-eye lens arrangement and the integrating rod 1008. At the plane 1012, an image of the entrance end of the integrator 1008 is shown, whereas plane 1014 shows the image of the output end of integrator 1008. It is desirable that the light distribution at plane 1012 be as smooth as possible.

Figure 14:
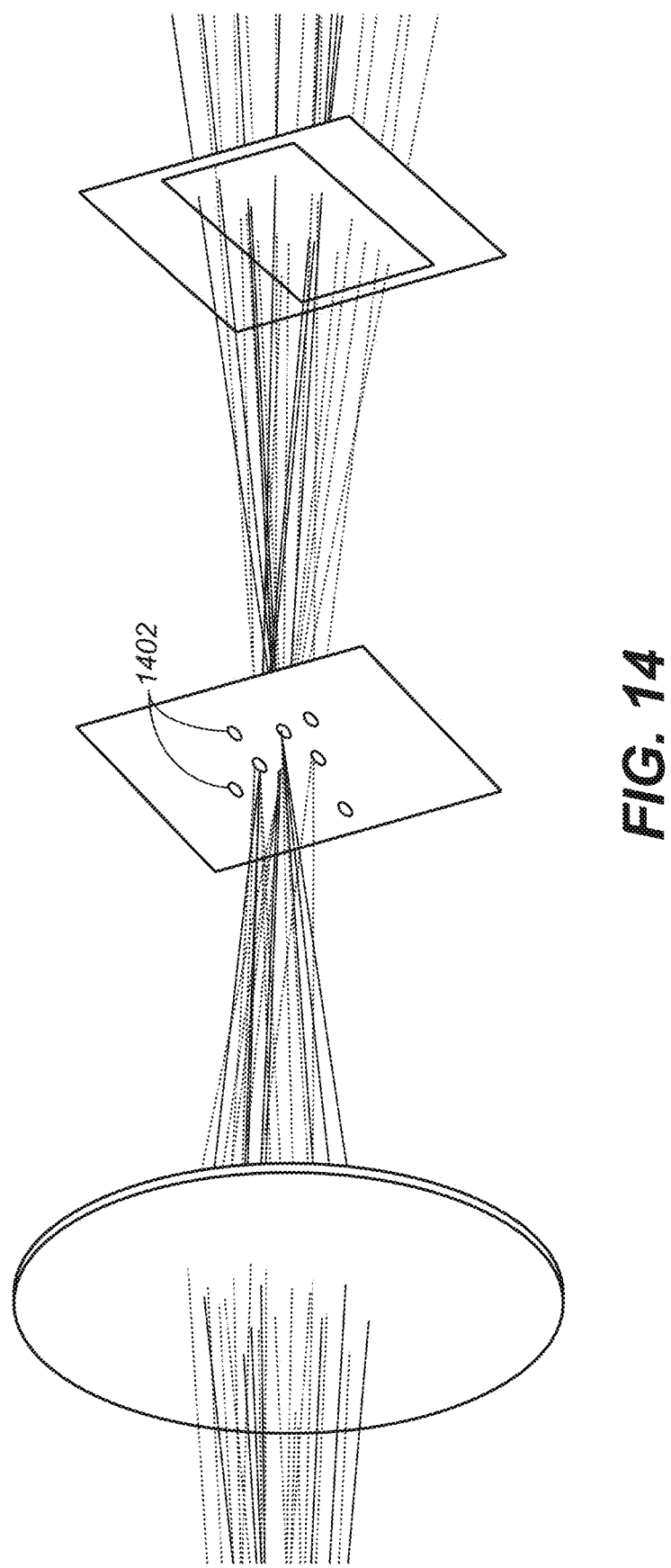
FIG. 14 depicts the possible cross-sectional illumination provided without the light being transmitted through a fly's-eye lens.

By contrast, FIG. 14 depicts the imaginary cross-section illumination when a fly's-eye lens in not employed. As may be seen, a seemingly discrete imaginary cross-section illumination (without fly's-eye lens FE) shows the effect of having only a small spot illuminated at the integrator 1008 entrance.

Figure 15:
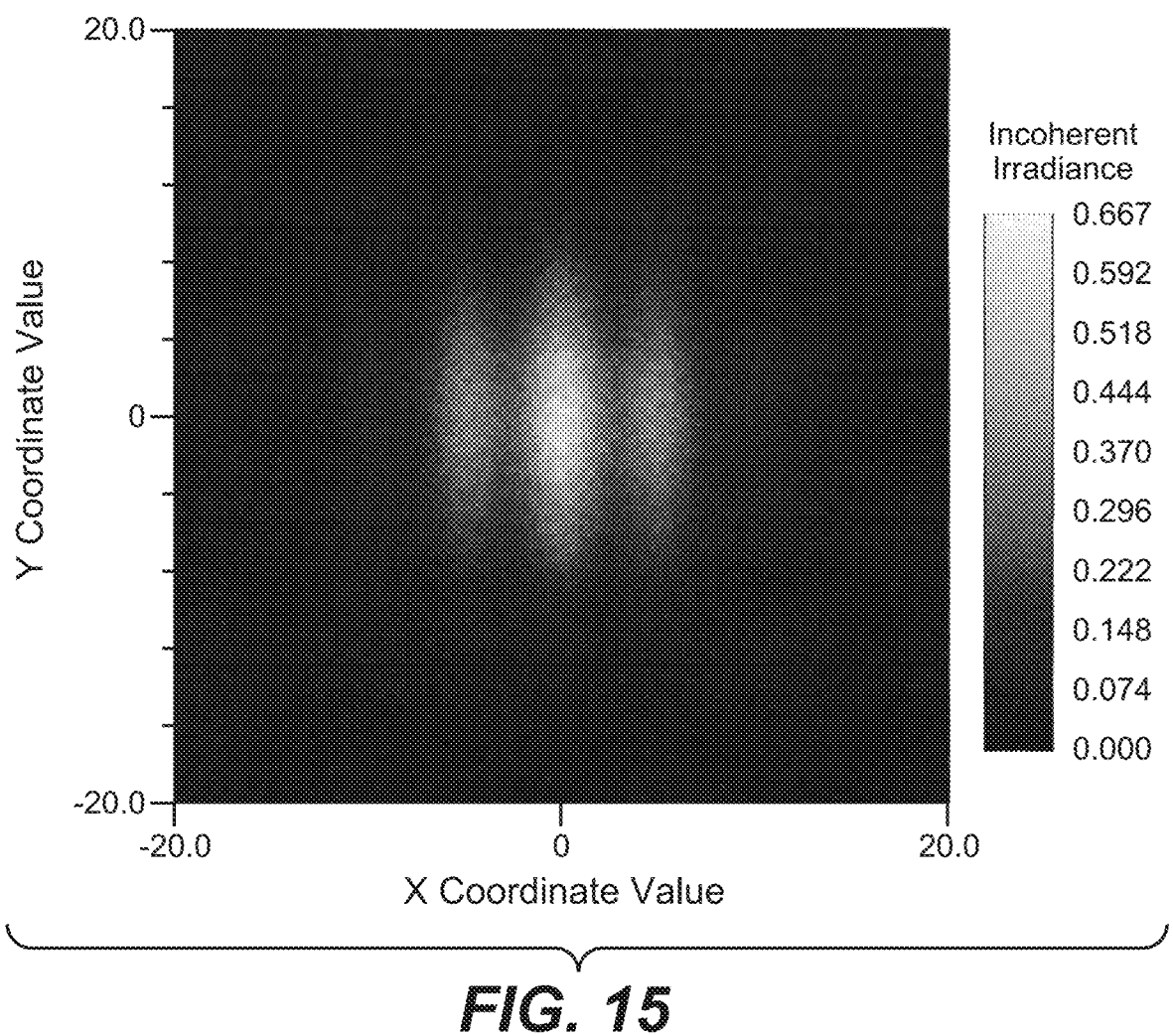
FIG. 15 depicts the image of a single point illumination at intermediate focal plane distal of the integrating rod without use of a fly's-eye lens in the light path.

In other views, FIG. 15 depicts the image of a single point illumination at intermediate focal plane distal of the integrating rod without use of a fly's-eye lens in the light path. In particular, FIG. 15 depicts the image at an intermediate focal plane with a projector system comprising a relatively small angle diffuser—e.g., 5 degree Full Width Half Max (FWHM) Gaussian diffuser between integrating rods, and a single point illumination at input to integrating rods.

Figure 16:
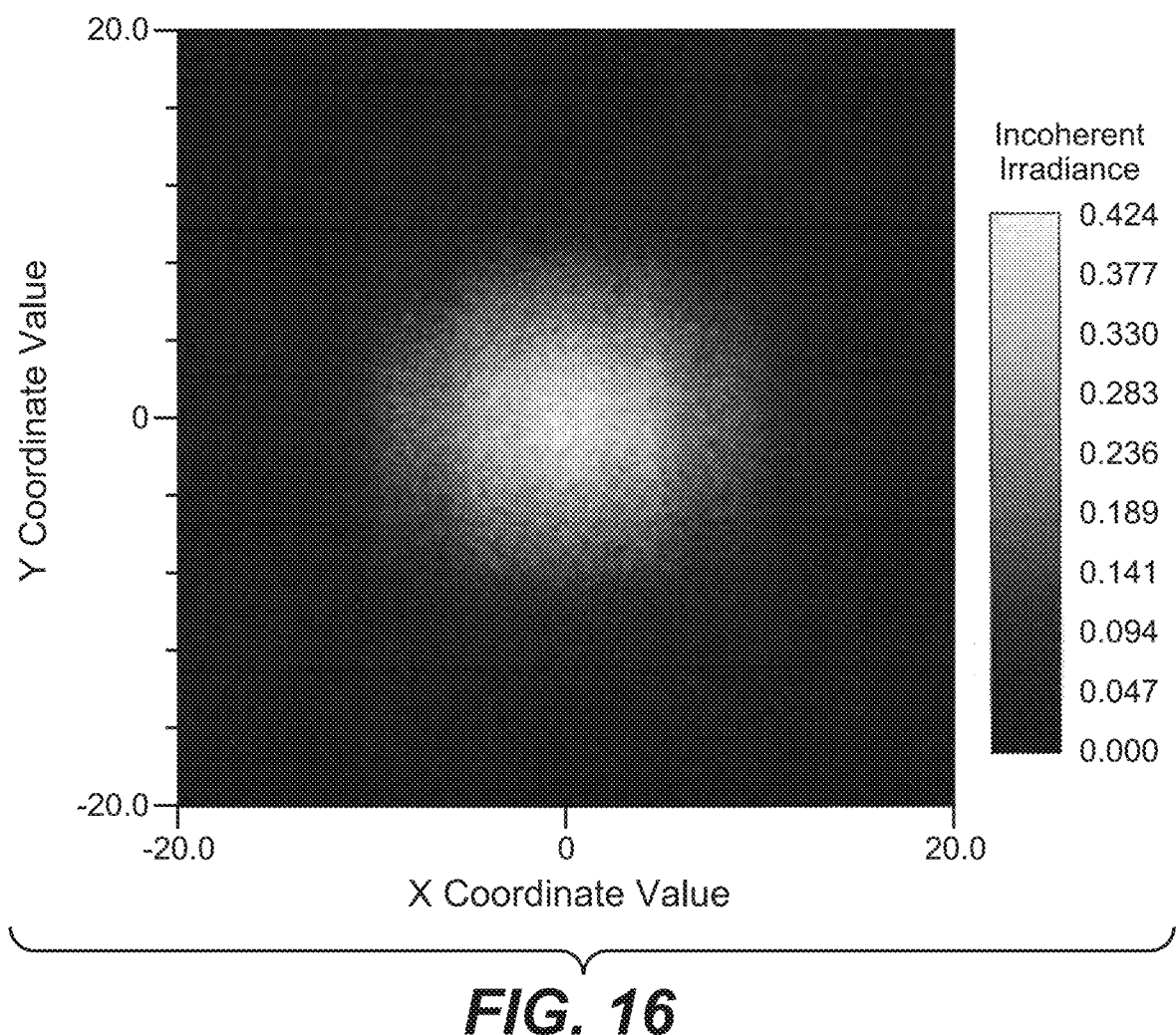
FIG. 16 depicts the image of a single point illumination at intermediate focal plane distal of the integrating rod and employing a fly's-eye lens in the light path.

FIG. 16 depicts the image of a single point illumination at intermediate focal plane distal of the integrating rod and employing a fly's-eye lens in the light path. It may be seen that use of the fly's-eye lens provides for a better uniform illumination and with much less structure. In particular, FIG. 16 depicts the image at an intermediate focal plane with a projector system comprising a relatively small angle diffuser—e.g., 5 degree Full Width Half Max (FWHM) Gaussian between integrating rods, and using a fly's eye illumination to fill the input of the integrating rods. In other embodiments, the small angle of the diffuser may range from 2-10 degrees.

In one embodiment having two integrating rods, a diffuser is between two integrating rods. For example, in FIG. 11, integrating rod 1008 may be constructed of two or more integrating rods. The diffuser is between two integrating rods. In many of the drawings of the application, there is shown only one integrating rod. In FIG. 11, there is an element marked integrating rod 1008. This element can be considered a separate piece in front of the integrating rod (also shown in FIG. 10). We can make this the diffuser (with a new number) and call it out appropriately in the specification.

In the case of dual modulation, when a single pixel of the premodulator is turned on, it can be thought of as a pinhole camera with infinite focal distance. Upstream images may be formed on intermediate planes between the pre-modulator and primary modulator. A single fiber image or multiple fiber images at the input to the integrating rod produce structure at the PSF optics between the pre-modulator and primary modulator. In order to avoid artifacts or structure on the PSF optics, the upstream image should be as broad and uniform as possible at the input to the integrating rod.

Figure 17B:
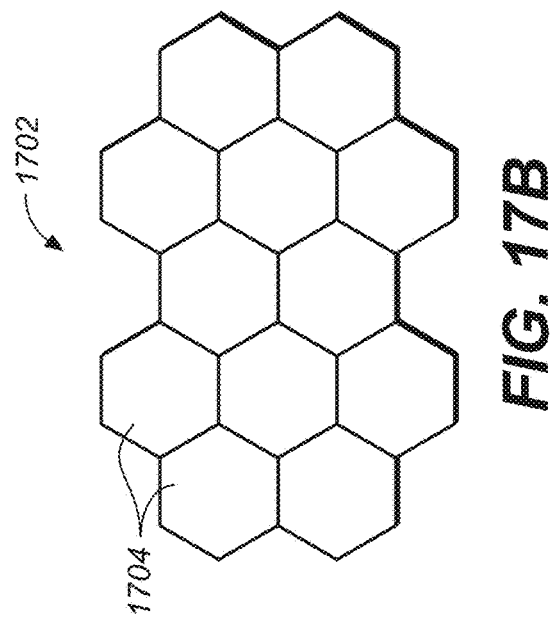
FIGS. 17A and 17B are side and end views, respectively, of a bundle of transparent rods that act as an optical homogenizing element in the projector system.
Figure 17A:
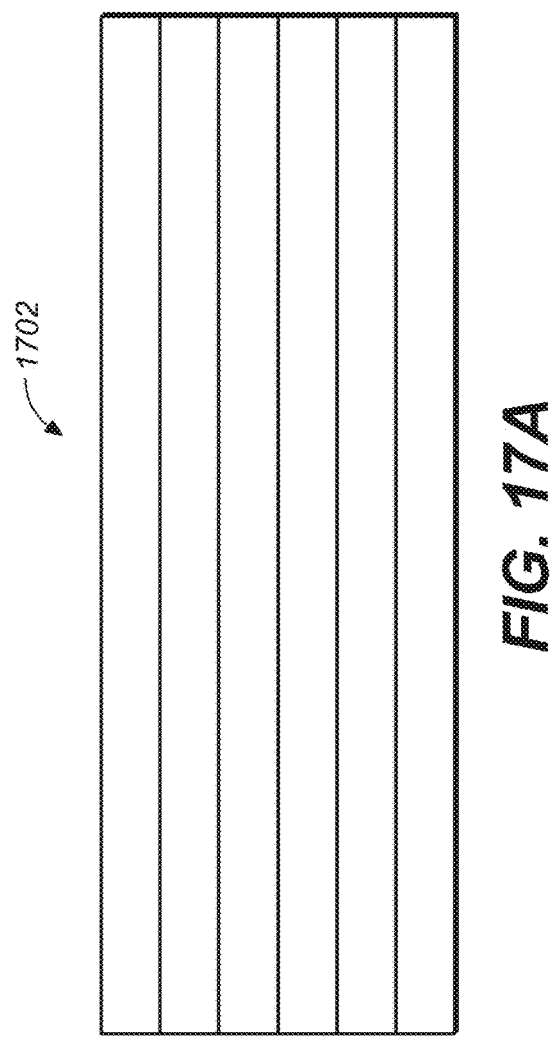

An optical homogenizing element may be used to spread the light entering the integrating rod so that there is no point in the system where an image has structure. The optical homogenizing element may be formed by a lenslet array such as a fly's eye lens, or, as an alternative embodiment (as shown in FIGS. 17A and B), a bundle 1702 of transparent rods 1704 fused together. In the case of a fused-rod bundle, the interfaces may have a lower index of refraction so that the light is internally guided to stay within each bundle. In the case of multiple optical fibers, the fused-rod bundle may have spacing similar to the spacing of the optical fibers, so that the light from each fiber is spread out to fill each rod.

Alternative Embodiments

For alternative embodiments, a single fly's-eye lens may be employed with or without an additional optical element/lens in a single arrangement. It may suffice that a fly's-eye lens provides the desired amount of angular distribution of illumination for downstream modulation. In another embodiment, the fly's-eye lens may make it possible to employ a smaller length of integrating rod than might be needed without the fly's-eye lens. For one embodiment, when a single beam is focused into a rod integrator (e.g., without diffuser) as in 1008, the light makes multiple reflections while passing through the rod. Due to the symmetry of the single laser beam and the bilateral symmetry of the integrating rod 1008 (in one embodiment, rectangular or some other suitable shape), the number of reflections performed (and therefore the length) to achieve a substantially uniform output at the rod exit may be large. Increasing the diversity of light rays impinging on the integrating rod, both spatially and angularly, may greatly reduce the number of reflections within the rod to achieve uniformity. The combination of 1006a and 1006b may provide such diversity.

In other embodiments that comprise more than one modulator, it may be desirable to employ a fly's-eye lens that substantially eliminates any structure in an intermediate cross-sectional area at various points—for example, between the fly's-eye lens and the integrating rod, between the integrating rod and the first modulator, between the first modulator and the second modulator and/or between any successive modulator stages.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various aspects of the present invention may be appreciated from the following enumerated example embodiments (EEEs):

EEE 1. A projection system, comprising:
a laser light source, the source providing light for further processing by the system;
a collimating lens, the collimating lens substantially collimating the light from the laser light source;
  a fly-eye lens, receiving substantially collimated light and providing a desired angular distribution of light;
  an integrating rod, receiving the light from the fly-eye lens and transmitting the light downstream; and
  a first modulator, receiving the light from the integrating rod and performing additional modulation to the light for the system to project an image.

EEE 2. The projector system of EEE 1 wherein further
  the fly's-eye lens illuminates a first lens, the first lens focusing the light from the fly's-eye lens onto the input of the integrating rod.

EEE 3. The projector system of EEE 1 wherein further the light received by the integrating rod is substantially uniform illumination.

EEE 4. The projector system of EEE 1 wherein further the light received by the integrating rod is substantially devoid of structure from the laser light source.

EEE 5. The projector system of EEE 1 further comprising:
  a second modulator, receiving the light from the first modulator and performing additional modulation to the light for the system to project an image.

EEE 6. The projector system of EEE 5 wherein further the light received by the second modulator is substantially devoid of structure from the laser light source.

EEE 7. The projector system of EEE 5 wherein further the light received by the second modulator is substantially uniform illumination.

EEE 8. The projector system of EEE 3 wherein further the light received by the first modulator is substantially devoid of structure from the laser light source.

EEE 9. The projector system of EEE 1 wherein the fly's-eye lens further comprises a focusing lens.

EEE 10. The projector system of EEE 9 wherein the light from fly's-eye lens is received by the focusing lens and the light transmitted through the focusing lens substantially creates a rectangular shaped spot.

EEE 11. The projector system of EEE 10 wherein the rectangular shaped spot substantially matches the facet of the integrating rod.

EEE 12. A method for providing a desired distribution of light in a projector system comprising a laser light fiber for input illumination, comprising:
  transmitting the light from the laser light fiber to a collimator;
  transmitting the light from the collimator to a fly's-eye lens; and
  transmitting the light from the fly's-eye lens to an integrating rod.

EEE 13. The method of EEE 12 further comprising:
transmitting the light from an integrating rod to a first modulator.

EEE 14. The method of EEE 12 wherein said light from the fly's-eye lens to the integrating rod is substantially devoid of structure from the laser light source.

EEE 15. The method of EEE 12 further comprising:
transmitting light from the fly's-eye lens to a focusing lens; and
further wherein the light from the focusing lens has substantially the same aspect ratio of the integrating rod facet.

EEE 16. The method of EEE 13 further comprising:
transmitting the light from the first modulator to a second modulator.

EEE 17. The method of EEE 16 wherein said light from the first modulator to the second modulator is substantially devoid of structure from the laser light source.

EEE 18. The method of EEE 16 wherein said light received at the second modulator is substantially of uniform illumination.

EEE 19. A dual modulation projection system comprising:
a first color lighting system comprising a first color narrowband light source, a spreading mechanism comprising a fly's eye lens and an integrating rod directly illuminating a first color modulator such that in an optical path between the first color narrowband light source light of the first color travels without being mixed and separated from light of other colors; and
second and third color lighting systems each similarly configured as the first color lighting system each illuminating corresponding second and third color modulators.

EEE 20. The dual modulation projection system according to EEE 19, wherein each lighting system further comprises additional optical elements in each optical path.

EEE 21. The dual modulation system according to EEE 20, wherein at least one of the additional optical elements is specifically tuned to the color of the optical channel.

EEE 22. A dual modulation projection system comprising:
a first color lighting system comprising a first color narrowband light source, a spreading mechanism comprising a fly's eye lens and an integrating rod and providing at least a portion of an optical path between the first color narrowband light source light and a first color modulating device;
second and third color lighting systems each similarly configured as the first color lighting system and sharing at least some optical components of the first lighting system each ultimately illuminating corresponding second and third color modulators;
wherein the first second and third color lights are mixed and then separated prior to illuminating each corresponding modulator.

EEE 23. The projection system according to EEE 22, wherein the shared optical components include the fly's eye lens, the integrating rod, and a collimator.

EEE 24. The projection system according to any of EEEs 19-23, wherein the projector is configured to alternate at least one of a resolution, spatial frequency, color space, of images projected by the projection system.

EEE 25. The projection system according to any of EEEs 19-23, wherein the projector is configured to have a different at least one of a resolution, spatial frequency, and color space, of images projected by the projection system onto a display screen relative to a images projected onto the same screen by a second projection system.

EEE 26. The projection system according to any of EEEs 19-23 further comprising a primary modulator in each color channel configured to be illuminated by a corresponding color light from each corresponding pre-modulator.

EEE 27. The projection system according to any of EEEs 19-23, wherein the modulators are pre-modulators configured to produce one of a low resolution and low spatial frequency image and the projection system further comprising diffusing elements between each pre-modulator and a primary modulator of a same color.

EEE 28. The projection system according to anyone of EEEs 1-9 and 15-27, wherein each first modulator, each pre-modulator, or each color modulator is a phase modulator.

EEE 29. The projection system according to any of EEEs 1-9 and 19-27, further comprising a controller configured to control a primary modulator illuminated by a pre-modulator comprising any of the first modulator of EEE 1 or color modulators of EEE 19, the controller further comprising a light field simulation module configured to determine a light field present on pixels of the primary modulator and wherein the light field simulation is determined based on a quality of the illumination on the pre-modulator, a point spread function of the pre-modulator, and diffusing optics, if any, in a light path between the pre-modulator and primary modulator.

EEE 30. A laser projector design comprising a shortened integrating rod, wherein an original design is changed shortening an integrating rod and adding a fly's eye lens.

EEE 31. A projector, method, or display comprising any of EEEs 1-30 wherein the integrating rod is of a length such that replacing it with a longer rod does not provide further uniformity in an image forming portion of light rays emitted from the integrating rod.

EEE 32. A projector, method, or display comprising any of EEEs 1-30 wherein the integrating rod is of a length sufficient to remove structure in light rays emitted from the integrating rod destined to form an image.

EEE 33. The projector, method, or display according to any of EEEs 1-32, wherein length of the integrating rod length is designed with consideration of spreading capabilities of the fly's eye lens and other optics together with the integrating rod and any distance between the integrating rod and other components to make the integrating rod as short as possible and able to provide structureless image forming light on a modulating surface.

EEE 34. A dual modulation projector comprising a pre-modulator and a primary modulator and optics configured to provide uniform or structureless angle profiles at an intermediate image position between the modulators.

EEE 35. The dual modulation projector according to EEE 34, wherein images produced by the pre-modulator are uniform or structureless spatial images.

EEE 36. A device comprising one of a projector, method, or display according to any of EEEs 1-35 wherein images produced by a modulators are structureless meaning light rays emitted from the modulators have a uniform angle profile.

EEE 37. A device comprising one of a projector, method, or display according to any of EEEs 1-35 wherein each portion of an image chain post integrating rod comprises light having rays with a uniform angle profile.

EEE 38. A device comprising one of a projector, method, or display according to any of EEEs 1-35 wherein images formed on the pre-modulators or first modulator in an image chain of the device, or device implementing the method, comprise light having rays with a uniform angle profile.

EEE 39. The device according to EEE 38, wherein the image chain includes one of an integrating rod and a shortened integrating rod, and fly's eye lens, prior to the first modulator.

EEE 40. The projector, method, or display according to any of EEEs 1-39, wherein the projector further comprises a small angle diffuser.

EEE 41. A display, comprising:
 a light source;
 a pre-modulator; and
 a series of optical components configured to convey light from the light source to the pre-modulator, comprising:
 a lens array configured to be illuminated by the light source and produce an overlapping pattern of illuminations each replicating the light source;
 a light homogenizer configured to homogenize the overlapping pattern of illuminations; and
 a small angle diffuser.

EEE 42. The display according to EEE 41, wherein the small angle diffuser diffuses light at angles of less than 5 degrees.

EEE 43. The display according to EEE 41, wherein the small angle diffuser diffuses light at angles of less than 10 degrees.

EEE 44. The display according to EEE 41, wherein the small angle diffuser diffuses light at angles of less than 7 degrees.

EEE 45. The display according to EEE 41, wherein the small angle diffuser diffuses light at angles starting at 0 degrees and up to and including 5 degrees.

EEE 46. The display according to EEE 41, wherein the small angle diffuser diffuses light at angles starting at 0 degrees and up to and including 7 degrees.

EEE 47. The display according to EEE 41, wherein the small angle diffuser diffuses light at angles starting at 0 degrees and up to and including 10 degrees.

EEE 48. The display according to any of EEEs 41-47, wherein the light homogenizer comprises a bifurcated integrating rod positioned around the small angle diffuser.

EEE 49. The display according to any of EEEs 41-48, further comprising a primary modulator illuminated by the pre-modulator, the primary modulator further modulating pre-modulated light from the pre-modulator.

EEE 50. The display according to EEE 49, further comprising a controller configured to energize the pre-modulator according to image data of an image to be displayed and a low diversity uniform illumination.

EEE 51. The display according to any of EEEs 41-50, wherein the angles of diffusion are Full Width at Half Maximum (FWHM).

EEE 52. The display according to any of EEEs 41-51, wherein the angles of diffusion are homogenously dispersed.

EEE 53. The display according to EEE 49, further comprising a controller configured to energize the primary modulator according to a light field calculation of an image produced by the pre-modulator on the primary modulator and wherein the pre-modulator image comprises a uniform low angle PSF dispersion low-angle diversity image having a resolution of less than the primary modulator.

EEE 54. The display according to any of EEEs 41-53, wherein the lens array comprises a fly's eye lens.

EEE 55. The display according to any of EEEs 41-54, wherein the light homogenizer comprises an integrating rod.

EEE 56. A projector, comprising a laser light source illuminating fly's eye lens projecting into an integrating rod and on to a small angle diffuser having a maximum FWHM diffusion angle of a set number of degrees and ultimately producing a uniform low angle diversity illumination on a pre-modulator energized to produce a low spatial frequency image projected onto a primary modulator energized according to image data and the low spatial frequency image so as to produce a high spatial frequency image.

EEE 57. The projector according to EEE 56, wherein the pre-modulator energization is based on image data representing the high spatial frequency image to be produced.

EEE 58. The projector according to EEE 56, wherein the low angle diversity illumination is based on the angle diversity of the small angle diffuser's set number of degrees being 5 degrees.

EEE 59. The projector according to EEE 56, wherein the low angle diversity illumination is based on the angle diversity of the small angle diffuser's set number of degrees being 7 degrees.

EEE 60. The projector according to any of EEEs 56-59, wherein the fly's eye lens is set an optical distance from an input of the integrating rod such that the optical elements of the fly's eye lens produce an overlapping pattern on the input of the integrating rod.

EEE 61. A projection system, comprising: a laser light source, the source providing light for further processing by the system;
 a collimating lens, the collimating lens substantially collimating the light from the laser light source;
 an optical homogenizing element, receiving the substantially collimated light and providing a desired angular distribution of light;
 an integrating rod, receiving the light from the optical homogenizing element and transmitting the light downstream; and
 a first modulator, receiving the light from the integrating rod and performing additional modulation to the light for the system to project an image.

EEE 62. The projector system of EEE 61 wherein the optical homogenizing element comprises a fly's-eye lens.

EEE 63. The projector system of EEE 61 wherein the optical homogenizing element comprises a fused-rod bundle.

The invention claimed is:

1. A projection system, comprising:
 a light source configured to emit light;
 an optical collimator configured to collimate the light emitted from the light source;
 an integrating rod;
 exactly one focusing lens disposed between the optical collimator and the integrating rod and configured to focus the light onto an input of the integrating rod;
 exactly one optical homogenizing element disposed between the optical collimator and the integrating rod, the optical homogenizing element being (a) configured to receive the light from the optical collimator and impose thereon an angular distribution before focusing of the light by the focusing lens, and (b) selected from the group consisting of a lenslet array and a fused rod bundle; and
 a first modulator configured to receive the light from the integrating rod and perform a modulation to the light for projecting an image.

2. The projection system of claim 1, wherein the optical homogenizing element is set at an optical distance from the integrating rod such that the optical elements of the optical homogenizing element produce a defocused overlapping pattern on the input of the integrating rod.

3. The projection system of claim 1, wherein the optical homogenizing element is configured so that the light received by the integrating rod has a substantially uniform illumination.

4. The projection system of claim 1, wherein the optical homogenizing element is a fly's-eye lens.

5. The projection system of claim 1, wherein the optical homogenizing element is configured so that the light received by the integrating rod is substantially devoid of structure from the light source.

6. The projection system of claim 1, further comprising:
a second modulator configured to receive the light from the first modulator and perform an additional modulation to the light for the projection system to project the image.

7. The projection system of claim 6, wherein the optical homogenizing element is configured so that the light received by the second modulator is substantially devoid of structure from the light source.

8. The projection system of claim 6, wherein the optical homogenizing element is configured so that the light received by the second modulator has a substantially uniform illumination.

9. The projection system of claim 1, wherein the light transmitted through the focusing lens substantially creates a rectangular spot on the integrating rod.

10. The projection system of claim 9, wherein the rectangular spot substantially matches a facet of the integrating rod.

11. A projection system comprising:
three color-specific lighting systems, each lighting system configured to process a respective one of a first color, a second color, and a third color, and each lighting system comprising:
a narrowband light source,
an optical collimator,
an integrating rod, and
exactly one spreading mechanism in an optical path between the optical collimator and the integrating rod, the spreading mechanism consisting of an optical homogenizing element and a focusing lens, the optical homogenizing element being selected from the group consisting of a lenslet array and a fused rod bundle, the focusing lens focusing the light from the optical homogenizing element onto an input of the integrating rod; and a first color modulator directly illuminated by the integrating rod of the lighting system specific to the first color, such that in an optical path from the narrowband light source of the lighting system specific to the first color, light of the first color travels without being mixed and separated from light of other colors.

12. The projection system of claim 11, wherein the optical homogenizing element is a fly's-eye lens.

13. The projection system of claim 11, wherein each of the lighting system specific to the second color and the lighting system specific to the third color respectively illuminates corresponding second and third color modulators.

14. A method for providing a desired distribution of light in a projection system, comprising:
collimating light emitted from a narrowband light source to form collimated light;
using a single optical homogenizing element, diverging the collimated light to form diverging light having an angular distribution, the optical homogenizing element being selected from the group consisting of a lenslet array and a fused rod bundle;
using a single focusing lens, focusing the diverging light having the angular distribution to an input of an integrating rod;
transmitting light, focused to the input by the focusing lens, through the integrating rod to a first modulator; and
using the first modulator, performing a modulation to the light for projecting an image.

15. The method of claim 14, wherein the optical homogenizing element is set at an optical distance from the integrating rod such that optical elements of the optical homogenizing element produce a defocused overlapping pattern on the input of the integrating rod, the optical elements being (a) lenses when the optical homogenizing element is a lenslet array and (b) rods when the optical homogenizing element is a fused rod bundle.

* * * * *